(12) United States Patent
Xing et al.

(10) Patent No.: US 8,923,898 B2
(45) Date of Patent: Dec. 30, 2014

(54) AVOIDING PAGING COLLISION AMONG MULTIPLE WIRELESS TECHNOLOGIES USING THE SAME RADIO

(75) Inventors: Longda Xing, San Jose, CA (US); Jianxiong Shi, Dublin, CA (US); Wen Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 13/533,028

(22) Filed: Jun. 26, 2012

(65) Prior Publication Data

US 2013/0344910 A1 Dec. 26, 2013

(51) Int. Cl.
*H04W 68/00* (2009.01)
(52) U.S. Cl.
USPC ............. 455/458; 455/552.1; 455/452.1; 455/434
(58) Field of Classification Search
CPC ............................. H04W 68/12; H04W 68/02
USPC .......... 455/515, 458, 422.1, 434, 436, 437, 455/452.1, 452.2, 459, 552.1, 67.11
See application file for complete search history.

(56) References Cited

U.S. PATENT DOCUMENTS

| 8,175,621 | B2 | 5/2012 | Hsu | |
| 8,611,933 | B2 * | 12/2013 | Chin et al. | 455/458 |
| 2003/0125073 | A1 | 7/2003 | Tsai et al. | |
| 2013/0035120 | A1 * | 2/2013 | Dhanda et al. | 455/458 |
| 2013/0090137 | A1 * | 4/2013 | Krishnamoorthy et al. | 455/458 |

FOREIGN PATENT DOCUMENTS

WO 2011/059521 5/2011

* cited by examiner

*Primary Examiner* — John J Lee
(74) *Attorney, Agent, or Firm* — Joel L. Stevens; Meyertons, Hood, Kivlin, Kowert & Goetzel, P.C.

(57) ABSTRACT

Maintaining communication of a wireless device and using a plurality of wireless communication technologies. A first paging message schedule may be determined for maintaining communication between the wireless device and a first base station associated with a first wireless communication technology. Similarly, a second paging message schedule may be determined for maintaining communication between the wireless device and a second base station associated with a second wireless technology. Additionally, a scheduling conflict may be determined between the first paging message schedule and the second paging message schedule. Accordingly, communication with the first base station may be switched to a third base station using the first wireless technology in response to determining that there is a scheduling conflict.

25 Claims, 4 Drawing Sheets

AVOIDING PAGING COLLISION AMONG MULTIPLE WIRELESS TECHNOLOGIES USING THE SAME RADIO

FIELD OF THE INVENTION

The present application relates to wireless communication, and more particularly to a system and method for avoiding paging collision among multiple wireless technologies using the same radio.

DESCRIPTION OF THE RELATED ART

Wireless communication systems are rapidly growing in usage. Further, wireless communication technology has evolved from voice-only communications to also include the transmission of data, such as Internet and multimedia content.

Some present wireless communication devices (e.g., cell phones) use a single radio for two or more wireless communication technologies, e.g., LTE and CDMA. In such systems, the wireless communication device may periodically tune from the first network to the second network, e.g., to listen to a paging channel. However, sometimes the wireless communication device is required to receive a paging message from both networks at the same time, which may not be possible using the same radio or antenna. Accordingly, improvements in wireless communication are desired.

SUMMARY OF THE INVENTION

Various embodiments are described of a system and method for avoiding paging collision when using multiple wireless communication technologies.

Initially, a user equipment (UE) device, such as a cell phone, may establish communication with (or "camp on") a first base station using a first wireless communication technology. The first base station may be associated with a first wireless network that uses the first wireless communication technology. Similarly, the UE device may establish communication (or camp on) a second base station using a second wireless communication technology. The second base station may be associated with a second wireless network that uses the second wireless communication technology.

For example, the UE device may be configured to communicate with the first base station using a fourth generation (4G) wireless communication technology, e.g., long term evolution (LTE). Similarly, the UE device may be configured to communicate with the second base station using a third generation (3G) or lower wireless communication technology, such as code division multiple access (CDMA). In one embodiment, the UE device may share a single radio and/or antenna to perform communication using the first and second wireless communication technologies.

In order to maintain communication with these base stations, a message schedule, e.g., for receiving paging messages, may be established for each base station. For example, each base station may determine a paging message schedule based on an identification number of the UE device (e.g., a UE ID). Accordingly, the UE device may receive scheduling information from the respective base stations.

In response, the UE device may determine whether there is a conflict between the two schedules. For example, the two schedules may require that the UE device receive a paging message from each base station at the same time, or approximately the same time (i.e., within a close enough time proximity to render reception by a single radio impossible). Where the UE device uses a same radio or antenna for receiving the paging messages associated with the different wireless communication technologies, such a schedule may not be feasible.

Accordingly, the UE device may determine whether another base station is available for one or both of the wireless technologies. For example, the UE device may determine if there is another base station of the first wireless network that is available for use, e.g., and able to provide communication above a quality threshold. Alternatively, or additionally, the UE device may determine if there is another base station of the second wireless network that is available for use, e.g., and able to provide communication above the quality threshold.

In response to determining the scheduling conflict and determining that another base station is available on at least one of the networks, the UE device may switch from communicating with one of the initial base stations to communicating with a new base station within the same network. For example, if another base station of the first network is available, then the UE device may switch from the first base station to the other base station of the first network. Similarly, if another base station of the second network is available, then the UE device may switch from the second base station to the other base station of the second network. Generally, the UE device may only switch communication for one of the networks at a time, not both.

Accordingly, the switch of communication will typically resolve the scheduling conflict. The method may be repeated any time a scheduling conflict is detected.

BRIEF DESCRIPTION OF THE DRAWINGS

A better understanding of the present invention can be obtained when the following detailed description of the embodiments is considered in conjunction with the following drawings.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
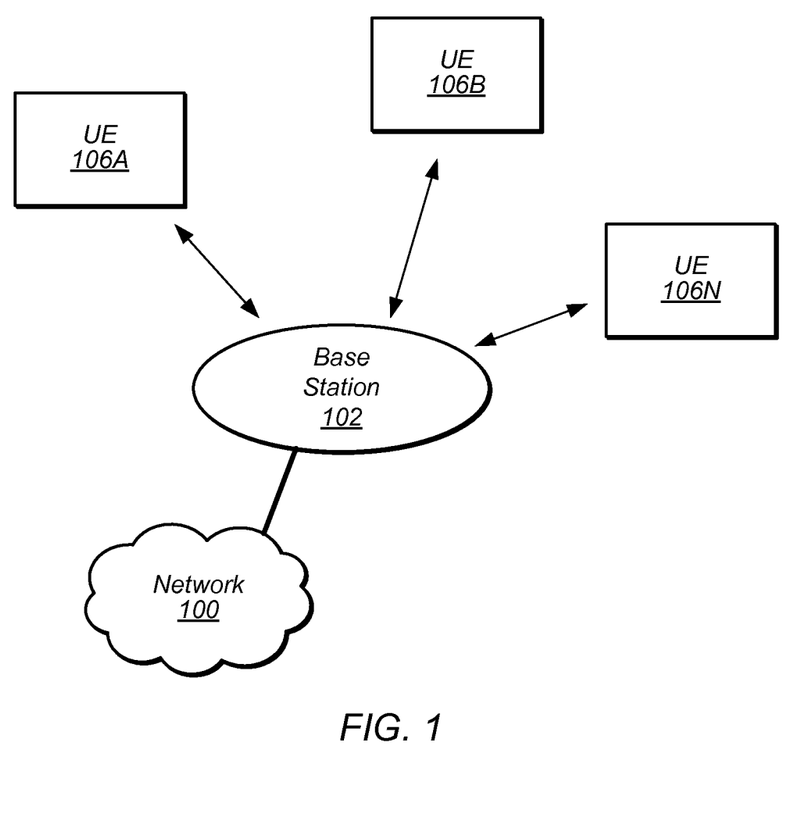
FIG. 1 illustrates an exemplary wireless communication system where multiple user devices communicate with a base station, according to one embodiment.
Figure 2:
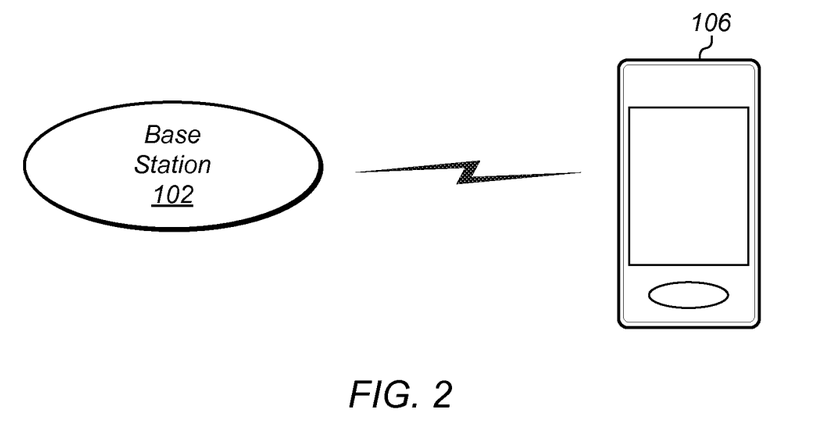
FIG. 2 illustrates a base station 102 in communication with user equipment 106.

FIGS. 1 and 2—Exemplary Communication System

FIGS. 1 and 2 illustrate an exemplary (and simplified) wireless communication system. It is noted that the system of FIG. 1 is merely one example of a possible system, and embodiments of the invention may be implemented in any of various systems, as desired.

As shown, the exemplary wireless communication system includes a base station 102 which communicates over a transmission medium with one or more User Equipment (UE) (or "UE devices") 106A through 106N.

The base station 102 may be a base transceiver station (BTS), base station controller (BSC), eveolved node B (eNB), etc. The base station may be housed within a cell tower, e.g., among one or more other base stations. The base station 102 may include hardware that enables wireless communication with the UEs 106A through 106N. The base station 102 may also be equipped to communicate with a network 100. Thus, the base station 102 may facilitate communication between the UEs and/or between the UEs and the network 100. The communication area (or coverage area) of the base station may be referred to as a "cell." The base station 102 and the UEs may be configured to communicate over the transmission medium using any of various wireless communication technologies such as GSM, CDMA, WLL, WAN, WiFi, WiMAX, LTE, etc.

FIG. 2 illustrates UE 106 (e.g., one of the devices 106A through 106N) in communication with the base station 102. The UE 106 may be a device with wireless network connectivity such as a mobile phone, a hand-held device, a computer or a tablet, or virtually any type of wireless device. The UE 106 may include a processor that is configured to execute program instructions stored in memory. The UE may perform any of the embodiments described herein by executing such stored instructions. In some embodiments, the UE may include a programmable hardware element such as an FPGA (field-programmable gate array) that is configured to perform any of the method embodiments described herein, or any portion of any of the method embodiments described herein.

Figure 3:
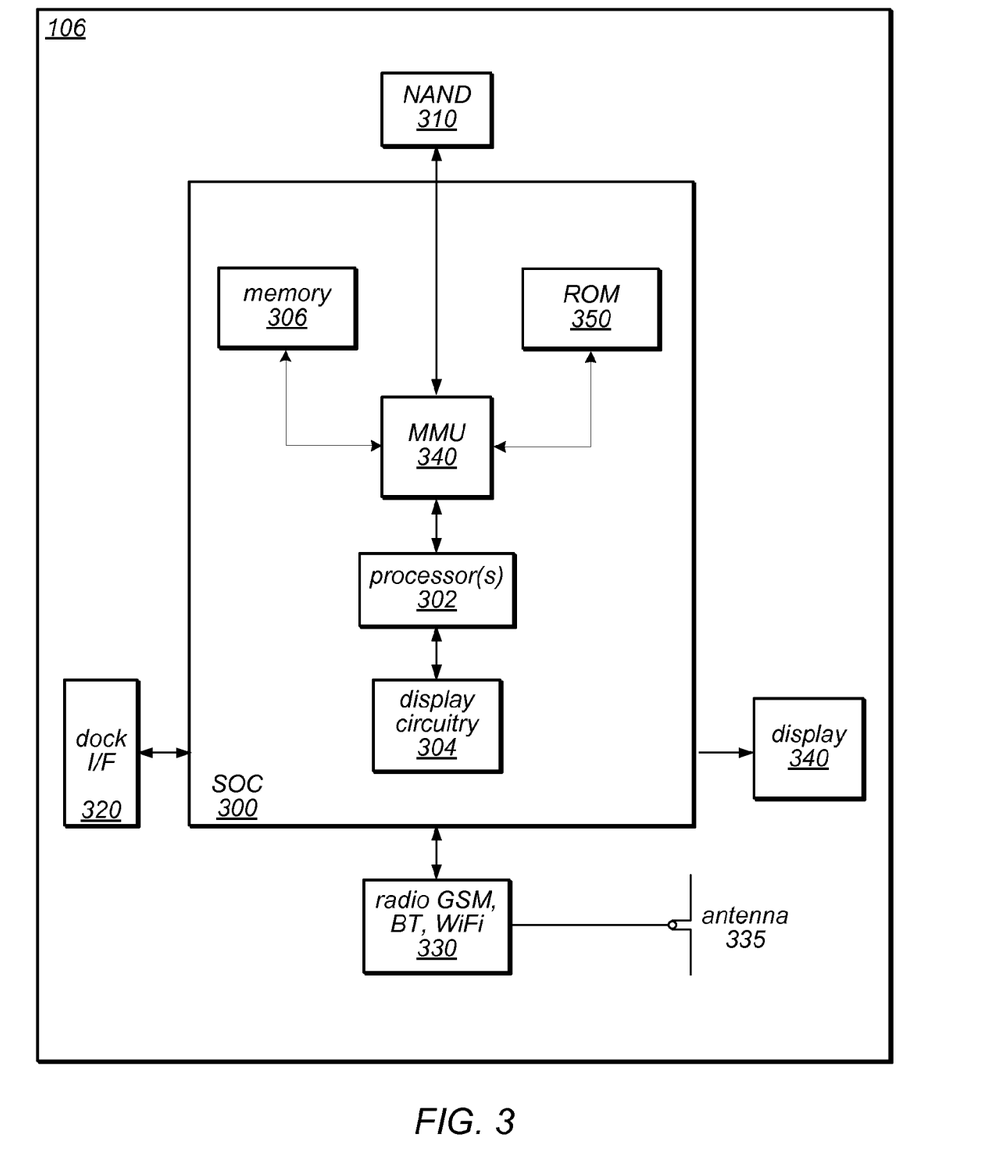
FIG. 3 illustrates an exemplary block diagram of a UE device 106, according to one embodiment.

FIG. 3—Exemplary Block Diagram of a UE

FIG. 3 illustrates an exemplary block diagram of the UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 340 may be configured to perform memory protection and page table translation or set up. In some embodiments, the MMU 340 may be included as a portion of the processor(s) 302.

As also shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry 330 (e.g., for LTE, CDMA, GSM, Bluetooth, WiFi, etc.) which may use antenna 335 to perform the wireless communication. In one embodiment, a single radio may be used to communicate with multiple networks (e.g., LTE and CDMA networks, among other types). The radio may periodically tune away from a first network (e.g., an LTE network) to listen to a paging channel of a second network (e.g., a CDMA network). Embodiments described herein may be particularly useful for such embodiments.

The hardware and/or software of the UE 106 may be used to implement various embodiments described herein.

Figure 4:
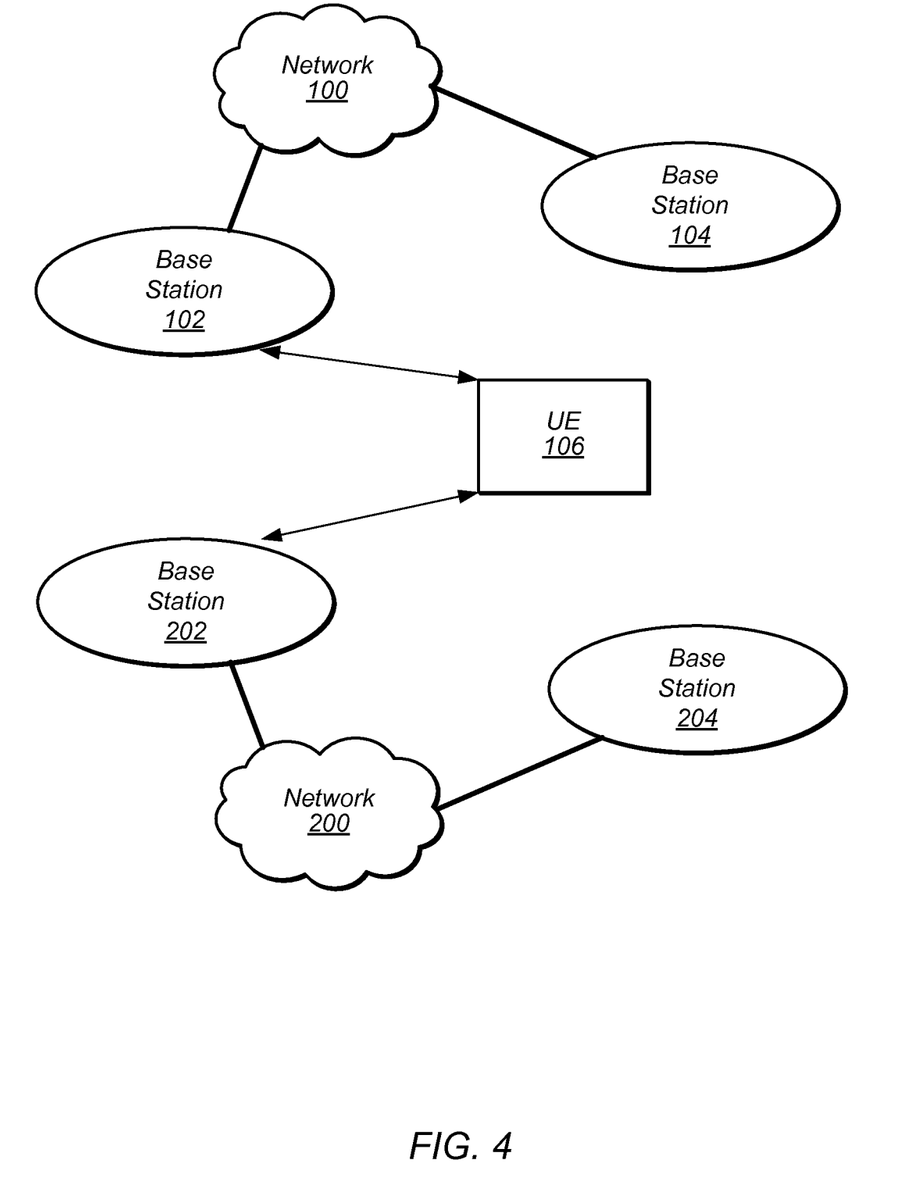
FIG. 4 illustrates an exemplary system of a UE 106 in communication with multiple base stations of multiple wireless networks.

FIG. 4—Exemplary Wireless Communication System With Multiple Networks

FIG. 4 illustrates an exemplary wireless communication system with multiple networks. The embodiments described herein may be particularly applicable to the wireless system shown in FIG. 4, though variations and modifications are envisioned.

More specifically, as shown, the UE 106 is coupled to networks 100 and 200 via base stations 102 and 202, respectively. For example, the UE 106 may be positioned at a location where base stations 102 and 202 both provide service to that location. Additionally, nearby base stations 104 and 204 may also provide service for the networks 100 and 200, respectively. The UE 106 may also be able to establish communication with these base stations from its current location, rather than base stations 102 and 202, with which it is currently connected.

In the embodiment of FIG. 4, the network 100, and correspondingly, base stations 102 and 104, may provide wireless communication for various UEs using a first wireless communication technology. For example, the base stations 102 and 104 may be configured to communicate with the UE 106 using a fourth generation (4G) wireless communication technology, such as LTE.

Similarly, the network 200, and correspondingly, base stations 202 and 204, may provide wireless communication for various UEs using a second wireless communication technology. For example, the base stations 202 and 204 may be configured to communicate with the UE 106 using a third generation (3G) or lower wireless communication technology, such as CDMA.

While base station 102 and 202 are shown separately, it is possible that they may be housed by a common cell tower or chassis, e.g., they may be colocated. Similarly, base stations 104 and 204 may share a cell tower and/or chassis. Additionally, the networks 100 and 200 may be provided by the same service provider and/or may be coupled together in a backend network. For example, a same service provider may provide a 4G network and a 3G or lower network in the same area, e.g., using the same cell towers.

Figure 5:
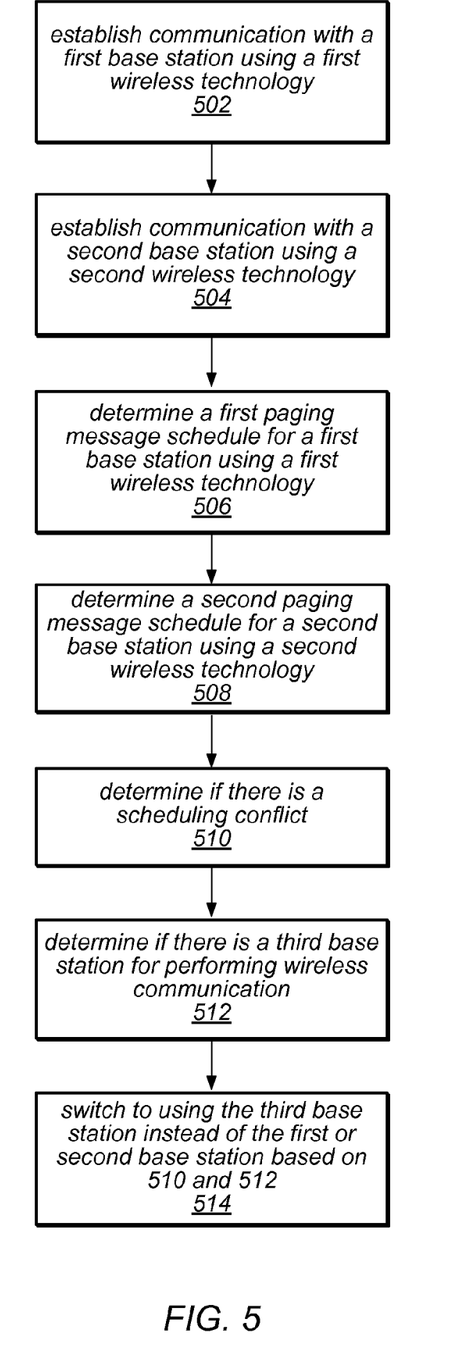
FIG. 5 is a flowchart diagram illustrating one embodiment of a method for maintaining communication of a UE device using multiple wireless communication technologies.

FIG. 5—Maintaining Communication of a UE Device Among Multiple Networks

FIG. 5 illustrates one embodiment of a method for maintaining communication of a UE device using multiple wireless communication technologies. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

Initially, in 502, a UE, such as UE 106, described above, may establish communication with (or "camp on") a first base station using a first wireless communication technology. The first base station may be associated with a first wireless network, e.g., the network 100, that uses the first wireless communication technology. For example, the UE device may be configured to communicate with the first base station using a fourth generation (4G) wireless communication technology, e.g., long term evolution (LTE).

Similarly, in 504, the UE may establish communication (or camp on) a second base station using a second wireless communication technology. The second base station may be associated with a second wireless network, e.g., the network 200, that uses the second wireless communication technology. For example, the UE device may be configured to communicate with the second base station using a third generation (3G) or lower wireless communication technology. As discussed above, the UE device may share a single radio and/or antenna to perform communication using the first and second wireless communication technologies.

In order to maintain communication with these base stations, a message schedule, e.g., for receiving paging messages, may be established for each base station. More specifically, in 506, a first paging message schedule may be determined for the UE device and the first base station. Similarly, in 508, a second paging message schedule may be determined for the UE device and the second base station. For example, each base station base stations may determine a respective paging message schedule based on an identification number of the UE device (e.g., a UE ID, such as an international mobile station identity (IMSI)). Accordingly, the UE device may receive scheduling information from the respective base stations. Other methods for determining the message schedule are envisioned.

In response, in 510, the UE device may determine whether there is a conflict between the two schedules. For example, the two schedules may require that the UE device receive a paging message from each base station at the same time. Where the UE device uses a same radio or antenna for receiving the paging messages associated with the different wireless communication technologies, such a schedule may not be feasible. In other words, the UE device may not be able to receive all of the paging messages from both base stations due to the determined message schedules.

As one specific example, the first base station may set a paging schedule from an initial time t as every 1.28 seconds, although other times are envisioned. Additionally, the second base station may set a paging schedule from the initial time t (or an initial time close enough to t to cause a conflict by using the radio) for every 0.64 seconds (similar other values as above are also envisioned). With these two exemplary schedules, if page cycles overlap, a paging message from either the first base station or second base station will be missed at every 1.28 seconds, which may be unacceptable for effective communication with the base stations.

Accordingly, in 512, the UE device may determine whether another base station is available for one or both of the wireless networks that would avoid the collision. For example, the UE device may determine if there is another base station of the first wireless network that is available for use, e.g., and able to provide communication above a quality threshold. Alternatively, or additionally, the UE device may determine if there is another base station of the second wireless network that is available for use, e.g., and able to provide communication above the quality threshold. Generally, the quality threshold may be one that allows the user to still have acceptable communication, e.g., above a threshold data speed, voice quality, etc.

In response to determining the scheduling conflict and determining that another base station is available on at least one of the networks, in 514, the UE device may switch from communicating with one of the initial base stations to communicating with a new base station within the same network. For example, if another base station of the first network is available, then the UE device may switch from the first base station to the other base station of the first network. Similarly, if another base station of the second network is available, then the UE device may switch from the second base station to the other base station of the second network. For example, using the exemplary system shown in FIG. 3, the UE device may switch from communicating with base station 102 to base station 104 or may switch from communication with base station 202 to base station 204. In one embodiment, the first pair of base stations that have scheduling conflict may be stored into avoidance data base for future reference, e.g., so that the same scheduling conflict may not occur again.

Generally, the UE device may only switch communication for one of the networks at a time, not both. In one embodiment, the UE device may have a preference for switching one of the networks over the other, e.g., based on the wireless communication technology. For example, the UE device may have a priority for switching the higher speed network instead of the lower speed network, or vice versa.

Where another base station is not available (e.g., in either network), preference may be given to one of the networks for the conflict. For example, the lower speed network may be given preference for receiving messages when a conflict will occur. Alternatively, the page messages, for each conflict, may alternate between the two networks, as desired. Note that since the intervals may be of varying length, even with conflicting schedules, there may still be successful receptions in between conflicts. In further embodiments, preference may be given to the base station that has the longest interval, e.g., since the other base station will have successful receptions in between that interval.

Accordingly, the switch of communication will typically resolve the scheduling conflict, as new scheduling information may be determined, e.g., by the new base station, which is unlikely to conflict with the current scheduling information. The method may be repeated any time a scheduling conflict is detected.

Further Embodiments

Note that in the present description, various embodiments are described in the context of LTE and CDMA. However, it is noted that the methods described herein can be generalized for any set of wireless communication technologies where paging schedules conflict, e.g., due to shared use of a radio and/or antenna.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for maintaining communication of a user equipment (UE) device using a plurality of wireless communication technologies, comprising:
   determining a first paging message schedule for the UE device and a first base station associated with a first wireless communication technology;
   determining a second paging message schedule for the UE device and a second base station associated with a second wireless technology;
   determining that there is a scheduling conflict between the first paging message schedule and the second paging message schedule; and
   switch from communicating with the first base station associated with the first wireless technology to communicating with a third base station associated with the first wireless technology in response to determining that there is a scheduling conflict.

2. The method of claim 1, wherein the UE device uses a same radio to communicate using the first wireless communication technology and the second wireless communication technology.

3. The method of claim 1, wherein the first wireless communication technology comprises a fourth generation (4G) wireless communication technology, and wherein the second wireless communication technology comprises a third generation (3G) or lower wireless communication technology.

4. The method of claim 1, wherein the first wireless communication technology comprises a long term evolution (LTE) wireless communication technology and wherein the second wireless communication technology comprises a code division multiple access (CDMA) wireless communication technology.

5. The method of claim 1, wherein said determining the first paging message schedule comprises receiving first information indicating the first paging message schedule from the first base station.

6. The method of claim 5, wherein said determining the second paging message schedule comprises receiving second information indicating the second paging message schedule from the second base station.

7. The method of claim 1, further comprising:
determining a third paging message schedule for the UE device and the third base station, wherein the third paging message schedule does not conflict with the second paging message schedule.

8. A user equipment (UE) device, the UE device comprising:
a radio configured to perform communication using a first wireless communication technology and a second wireless communication technology;
device logic coupled to the radio and configured to:
establish communication with a first base station associated with the first wireless communication technology;
establish communication with a second base station associated with the second communication technology;
determine if there is a paging message scheduling conflict between communication of the UE device with the first base station and communication of the UE device with the second base station;
establish communication with a third base station associated with the first communication technology in response to a determination of the paging message scheduling conflict.

9. The UE device of claim 8, wherein, after establishing communication with the third base station, there is not a paging message scheduling conflict between communication of the UE device with the second base station and communication of the UE device with the third base station.

10. The UE device of claim 8, wherein the first wireless communication technology comprises a long term evolution (LTE) wireless communication technology.

11. The UE device of claim 8, wherein the first wireless communication technology comprises a fourth generation (4G) wireless communication technology.

12. The UE device of claim 8, wherein the first wireless communication technology comprises a code division multiple access (CDMA) wireless communication technology.

13. The UE device of claim 8, wherein the first wireless communication technology comprises a third generation (4G) or less wireless communication technology.

14. A non-transitory, computer accessible memory medium storing program instructions for maintaining communication of a user equipment (UE) device using a plurality of wireless communication technologies, wherein the program instructions are executable to:
receive first paging message scheduling information from a first base station associated with a first wireless communication technology;
receive second paging message scheduling information from a second base station associated with a second wireless communication technology;
determine if there is a conflict between the first paging message scheduling information and the second paging message scheduling information;
determine if there is a third base station that provides wireless communication above a quality threshold using the first wireless communication technology;
switch from communicating with the first base station using the first wireless communication technology to communicating with the third base station using the first wireless communication technology in response to a determination that there is a paging message scheduling conflict and in response to a determination that the third base station provides the wireless communication above the quality threshold.

15. The non-transitory, computer accessible memory medium of claim 14, wherein the UE device uses a same radio to communicate using the first wireless communication technology and the second wireless communication technology.

16. The non-transitory, computer accessible memory medium of claim 14, wherein the first wireless communication technology comprises a fourth generation wireless communication technology.

17. The non-transitory, computer accessible memory medium of claim 14, wherein the first wireless communication technology comprises a third generation or lower wireless communication technology.

18. The non-transitory, computer accessible memory medium of claim 14, wherein the first wireless communication technology comprises a long term evolution (LTE) wireless communication technology and wherein the second wireless communication technology comprises a code division multiple access (CDMA) wireless communication technology.

19. A method for maintaining communication of a user equipment (UE) device using a plurality of wireless communication technologies, comprising:
determining a first paging message schedule for the UE device and a first base station associated with a first wireless communication technology;
determining a second paging message schedule for the UE device and a second base station associated with a second wireless technology;
determining that there is a scheduling conflict between the first paging message schedule and the second paging message schedule;
determining if there is a third base station that provides wireless communication above a quality threshold using the first or second wireless communication technology;
switch from communicating with the first or second base station to communicating with the third base station associated with the first or second wireless technology, respectively, in response to determining the scheduling conflict and in response to a determination that the third base station provides the wireless communication using the first or second wireless communication technology, respectively, above the quality threshold.

20. The method of claim 19,
wherein said determining if there is the third base station that provides the wireless communication above the quality threshold comprises determining that there is the third base station that provides the wireless communication above the quality threshold using the first wireless communication technology;
wherein said switching from communicating comprises switching to communicating with the second base station to communicating with the third base station based on said determining that there is the third base station that provides the wireless communication above the quality threshold using the first wireless communication technology.

21. The method of claim 19,
wherein said determining if there is the third base station that provides the wireless communication above the quality threshold comprises determining that there is the third base station that provides the wireless communication above the quality threshold using the second wireless communication technology;
wherein said switching from communicating comprises switching to communicating with the second base station to communicating with the third base station based on said determining that there is the third base station that provides the wireless communication above the quality threshold using the second wireless communication technology.

22. The method of claim 19, wherein the first wireless communication technology comprises a fourth generation wireless communication technology.

23. The method of claim 22, wherein the second wireless communication technology comprises a third generation or lower wireless communication technology.

24. The method of claim 19, further comprising:
    storing information indicating the scheduling conflict between the first base station and the second base station in order to avoid future scheduling conflicts.

25. A user equipment (UE) device, the UE device comprising:
    a radio configured to perform communication using long term evolution (LTE) wireless communication and code division multiple access (CDMA) wireless communication; device logic coupled to the radio and configured to:
    receive first paging message scheduling information from a first base station using LTE;
    receive second paging message scheduling information from a second base station using CDMA;
    determine if there is a conflict between the first paging message scheduling information and the second paging message scheduling information;
    determine if there is a third base station that provides wireless communication above a quality threshold using LTE;
    switch from communicating with the first base station to communicating with the third base station using LTE in response to a determination that there is a paging message scheduling conflict and in response to a determination that the third base station provides the wireless communication above the quality threshold.

* * * * *